United States Patent
Kato et al.

(10) Patent No.: US 10,471,561 B2
(45) Date of Patent: Nov. 12, 2019

(54) PALLET CHANGING APPARATUS

(71) Applicant: Matsuura Machinery Corporation, Fukui, Fukui (JP)

(72) Inventors: Toshihiko Kato, Fukui (JP); Takashi Tameto, Fukui (JP); Kyusuke Horiguchi, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 0 days.

(21) Appl. No.: 16/145,477

(22) Filed: Sep. 28, 2018

(65) Prior Publication Data

US 2019/0118320 A1 Apr. 25, 2019

(30) Foreign Application Priority Data

Oct. 20, 2017 (JP) ................. 2017-203596

(51) Int. Cl.
*B23Q 7/14* (2006.01)
*B23Q 11/08* (2006.01)
*B23Q 1/48* (2006.01)

(52) U.S. Cl.
CPC ......... *B23Q 7/1431* (2013.01); *B23Q 1/4876* (2013.01); *B23Q 11/08* (2013.01);
(Continued)

(58) Field of Classification Search
CPC ............. Y10T 29/5196; Y10T 29/5124; Y10T 409/30532; Y10T 409/305432; Y10T 409/306048; Y10T 409/306104; Y10T 483/16; Y10T 483/165; Y10T 409/305656–305824; Y10T 409/30896; B23Q 1/66; B23Q 7/1431; B23Q 7/1426–7/1494; B23Q 1/4876; B23Q 1/488; B23Q 1/5406; B23Q 1/5437; B23Q 11/08–11/0891
(Continued)

(56) References Cited

U.S. PATENT DOCUMENTS 4,673,076 A * 6/1987 Mattson ............... B23Q 7/1431
29/33 P
4,712,282 A * 12/1987 Romeu .................. B23Q 1/012
29/33 P
(Continued)

FOREIGN PATENT DOCUMENTS

DE 202010000754 U1 * 6/2011
DE 102016116086 A * 3/2018
(Continued)

*Primary Examiner* — Erica E Cadugan
(74) *Attorney, Agent, or Firm* — Richard M. Goldberg

(57) ABSTRACT

A pallet changing apparatus adopting a table 4 capable of moving back from and forth for a side of a turning shaft 1 and having an oscillating portion 41 for placing workpieces W, W' by means of pallets P, P' so as to oscillate freely by a rising portion 42 at the leading end of the table 4, wherein the turning shaft 1 covers a turning supporting portion 11 at its lower end side and turns together with a pallet changing arm 3 and moves freely in a vertical direction, and an insertion and removal hole 20 is provided, at the covering region, and allows the rising portion 42 to be inserted into the insertion and removal hole 20 and removed from the insertion and removal hole 20.

11 Claims, 5 Drawing Sheets

(52) U.S. Cl.
CPC ........... *B23Q 1/488* (2013.01); *Y10T 29/5196* (2015.01); *Y10T 409/30392* (2015.01); *Y10T 409/305768* (2015.01); *Y10T 409/305824* (2015.01)

(58) Field of Classification Search
USPC ......... 29/33 P, 563; 409/159, 161, 172, 173, 409/165–168, 224; 198/345.3, 346.1; 483/14–15
See application file for complete search history.

(56) References Cited

U.S. PATENT DOCUMENTS

| | | | | |
|---|---|---|---|---|
| 7,013,544 | B2 * | 3/2006 | Yasuda | B23Q 7/1431 29/33 P |
| 7,721,398 | B2 * | 5/2010 | Bernhard | B23Q 1/012 198/345.3 |
| 8,505,894 | B2 * | 8/2013 | Takahashi | B23Q 1/66 29/33 P |
| 8,640,313 | B2 * | 2/2014 | Horn | B23Q 7/1431 29/33 P |
| 8,769,791 | B2 * | 7/2014 | Kawada | B23Q 1/015 29/33 P |
| 9,616,539 | B2 * | 4/2017 | Benz | B23Q 1/25 |
| 2007/0289115 | A1 * | 12/2007 | Kawai | B23Q 1/4852 29/33 P |
| 2015/0298272 | A1 * | 10/2015 | Murata | B23Q 7/1431 414/222.07 |
| 2015/0336229 | A1 * | 11/2015 | Nishida | B23Q 11/0891 414/222.07 |
| 2019/0118321 | A1 * | 4/2019 | Kato | B23Q 7/1431 |

FOREIGN PATENT DOCUMENTS

| | | | |
|---|---|---|---|
| EP | 1402991 A2 | * | 3/2004 |
| EP | 3132889 A1 | * | 2/2017 |
| JP | 2004-160601 A | | 6/2004 |
| JP | 2007-152506 A | * | 6/2007 |
| JP | 2008-062312 A | * | 3/2008 |
| JP | 2009-297821 A | * | 12/2009 |
| JP | 2015/177906 A | | 10/2015 |
| JP | 2015-205356 A | | 11/2015 |
| WO | 2015/177906 A1 | | 11/2015 |

* cited by examiner

Door for Opening and Closing the Insertion and Removal Hollow Space

PALLET CHANGING APPARATUS

TECHNICAL FIELD

This invention relates to a pallet changing apparatus which arranges a turning shaft for supporting a pallet changing arm transferring a pallet between a pallet setup base and a table in such a manner so as to move freely in a vertical direction and also in a state of being stationary in a horizontal direction.

BACKGROUND OF THE INVENTION

The pallet changing apparatus equips, as essential constituents, the pallet setup base which places a pallet, the table which places a workpiece with a state of before processing or after processed by means of the pallet, and the turning shaft which holds pallet changing arms extended on both sides and also turns along a horizontal direction together with the pallet changing arms.

The turning shaft equips a turning supporting portion which allows a ball bearing device, etc., to turn smoothly below a site which supports the pallet changing arm. In recent years, there is favorably adopted such a configuration that has a covering portion which covers from above a turning supporting portion in order to prevent chips generated due to cutting of workpieces by a main shaft from entering into the turning supporting portion.

On the other hand, for the sake of convenience of cutting work by the main shaft, the table often equips a rising portion which has an occillating center axis at a leading end of the table on the side of the turning shaft for allowing a region which places a workpiece by means of a pallet to oscillate freely and also equips an oscillating portion in which the region is supported by the turning shaft.

Where the table having the above-described rising portion moves back from and forth for a side of the turning shaft having the covering portion, the presence of the rising portion inevitably hinders the turning of the pallet changing arm.

Further, the fact that a certain space is occupied by the turning shaft firmly fixing the covering portion makes it worse since the above-mentioned is necessary for hindering problem.

In order to avoid the above-described problem, instead of the table which has the rising portion and moves back from and forth for a side of the turning shaft, there can be conceived such a configuration that, as shown in FIG. 5, a turning shaft 1 which firmly fixes a covering portion 2 is arranged at a side portion in a direction at which a table 4 which has an oscillating portion 41 and a rising portion 42 at the leading end side of the table moves back and forth, a pallet setup base 5 is arranged at a side portion further away from the table 4, and also the direction at which the table 4 moves back and forth is orthogonal to a direction at which the turning shaft 1 and the setup base 5 are arranged.

However, in the case of the configuration of the above-described arrangement, in addition to a space region in a direction at which the table 4 moves back and forth, a space region is also necessary at the side portion for changing a pallet. Thereby, it is impossible to achieve a compact pallet changing apparatus.

Where the configuration in which the table moves back from and forth for a side of the turning shaft is compared with the above-described configuration in which the constituents are arranged at the side portions, there is found such a relationship that the former configuration is larger in a region in which the table overlaps with the pallet changing arm in a vertical direction than the latter configuration. In the former configuration, it is possible to set the space necessary for turning of the pallet changing arm small.

Instead of the configuration in which the constituents are arranged at the side portions, where there is retained the configuration in which the table having the rising portion and the oscillating portion moves back from and forth for a side of the turning shaft, it is possible to conceive such a configuration that, on transfer of a pallet by using a table and a setup base, a turning shaft moves from an intermediate position between the table and the setup base to a position suitable for the transfer.

However, in the case of the above-described configuration, it is essential that not only the table moves back and forth but also the turning shaft moves. Therefore, complicated control becomes essential.

With regard to a pallet changing apparatus, various publicly-known technologies have been disclosed.

Of these publicly known technologies, in Patent Document 1, an oscillatory table 6 is moved by a table-driving device 30. However, a supporting shaft 42 which corresponds to the turning shaft is arranged at an oblique side portion in a direction at which the table 6 moves (FIGS. 1, 2, 4: the supporting shaft 42 is not provided with a covering portion).

However, as compared with the case of the orthogonal state shown in FIG. 5, the configuration of the above arrangement is such that a space region of the side portion necessary for changing a pallet is slightly smaller. This configuration is also unable to achieve a compact pallet changing apparatus.

In Patent Document 2, a turning member 34 which corresponds to the pallet changing arm is installed on a side of a table 6 which can oscillate along an oscillating axis 19 provided at a supporting portion 17 which corresponds to the rising portion, and also one of or both of the table 6 and a turning member 34 are allowed to move back and forth with each other (FIG. 2 and claim 1: the turning member 34 is not provided with a covering portion).

However, the above-described configuration is also similar to the configuration shown in FIG. 5 and the configuration described in Patent Document 1 in that it is unable to achieve a compact pallet changing apparatus.

Additionally, in the case of the above-described configuration, the table 6 is not only required to move back from and forth for a side of a lower region of the main shaft, but the turning member 34 and/or the table 6 are also required to move back and forth with each other in a direction different from the above-described back and forth movement. Therefore, complicated control is essential.

As described so far, although referring the publicly known technologies, proposal is not found for compact configuration of a pallet changing apparatus at all which supports a workpiece so as to oscillate by means of a pallet and which is provided with a rising portion having an oscillating center axis at the leading end of the turning shaft of the table which moves back from and forth for a side of the turning shaft and also covers from above a turning supporting portion at a lower end of the turning shaft.

PRIOR ART DOCUMENTS

Patent Documents

[Patent Document 1] Japanese Published Unexamined Patent Application No. 2004-160601
[Patent Document 2] Japanese Published Unexamined Patent Application No. 2015-205356

SUMMARY OF INVENTION

Problem to be Solved

An object of the present invention is to provide a compact configuration of a pallet changing apparatus which equips a rising portion with an oscillating center axis at a leading end of the table that supports a workpiece by oscillatory state by means of a pallet and moves back from and forth for a side of the turning shaft and which covers the turning supporting portion at a lower end of the turning shaft from the upper side.

Solution to Problem

In order to solve the above problem, basic configurations of the invention are composed of:

(1) A pallet changing apparatus which equips a turning shaft for supporting a pallet changing arm transferring a pallet between a pallet setup base and a table in such a manner so as to move freely in a vertical direction and also in a state of being stationary in a horizontal direction, wherein the table moves back from and forth for a side of the turning shaft and also equips a rising portion at the leading end of the table on the side of the turning shaft and an oscillating portion which is supported by means of an oscillating center axis of the rising portion so as to oscillate freely and also places a workpiece by means of a pallet, wherein the turning shaft firmly fixes a covering portion which covers a turning supporting portion positioned at a lower end side of the turning shaft from upper side, and the covering portion equips an insertion and removal hollow space which allows the rising portion to be inserted and removed freely, and wherein the pallet changing arms equip a pallet supporting portion extending in a horizontal direction for transferring a pallet on both sides from side positions of the insertion and removal hollow space, and (2) A pallet changing apparatus which equips a turning shaft for supporting a pallet changing arm transferring a pallet between a pallet setup base and a table in such a manner so as to move freely in a vertical direction and also in a state of being stationary in a horizontal direction, wherein the table moves back from and forth for a side of the turning shaft and equips a rising portion at the leading end of the table on the side of the turning shaft and an oscillating portion which is supported by means of an oscillating center axis of the rising portion so as to oscillate freely and also places a workpiece by means of a pallet, wherein the turning shaft firmly fixes a movable covering portion which extends the pallet changing arms on both sides, and a stationary covering portion which covers a turning supporting portion positioned at a lower end side of the turning shaft is arranged on a floor below the movable covering portion from upper side, the stationary covering portion having an insertion and removal hollow space which allows the rising portion to be inserted and removed freely, and wherein the pallet changing arms equip a pallet supporting portion extending in a horizontal direction for transferring a pallet and a cross-linking extending portion for cross-linking the positions of the both sides of the movable covering portion.

Advantageous Effects of Invention

This invention which is based on the basic configurations (1) and (2) equips the insertion and removal hollow space of the covering portion (in the case of the basic configuration (1)) or the insertion and removal hollow space of the stationary covering portion (in the case of the basic configuration (2)) which allows the rising portion positioned at the leading end of the table on the side of the turning shaft and a certain region of the table connected to the rising portion to be inserted and removed freely. Therefore, where the rising portion is inserted into the insertion and removal hollow space, no hindrance occurs at all to turning of the pallet changing arms (in the case of the basic configuration (1)) extended on both sides from the covering portion or turning of the pallet changing arms (in the case of the basic configuration (2)) extended on both sides from the movable covering portion.

Further, by inserting the rising portion positioned at the leading end of the table into the insertion and removal hollow space, a pallet placed on the table can be arranged in a closed state to the turning shaft side, although the covering portion (in the case of the basic configuration (1)) or the stationary covering portion (in the case of the basic configuration (2)) is present between the table and the pallet setup base.

In other words, since a pallet can be arranged in a state of being made close, the pallet changing arms can be designed shorter in length as compared with the prior arts, thus making it possible to achieve a compact pallet changing apparatus.

BRIEF DESCRIPTION OF DRAWINGS

FIGS. 1(a) and 1(b) show a configuration of the basic configuration (1), wherein FIG. 1(a) shows a side sectional view along a direction at which the table moves back and forth (the covering portion and the pallet changing arms are shown by a sectional view, and other constituents are shown by a side elevational view. Further, a patterned portion shows a region other than the rising portion and the oscillating portion of the table), and FIG. 1(b) shows a front view of the covering portion which is a side at which the insertion and removal hollow space is provided.

FIGS. 2(a) and 2(b) show a configuration of the basic configuration (2), wherein FIG. 2(a) shows a side sectional view along a direction at which the table moves back and forth (the covering portion and the pallet changing arms are shown by a sectional view, and other constituents are shown by a side elevational view. Further, a patterned portion shows a region other than the rising portion and the oscillating portion of the table), and FIG. 2(b) shows a front view of the covering portion which is a side at which the insertion and removal hollow space is provided.

DESCRIPTION OF EMBODIMENTS

Figure 1A:
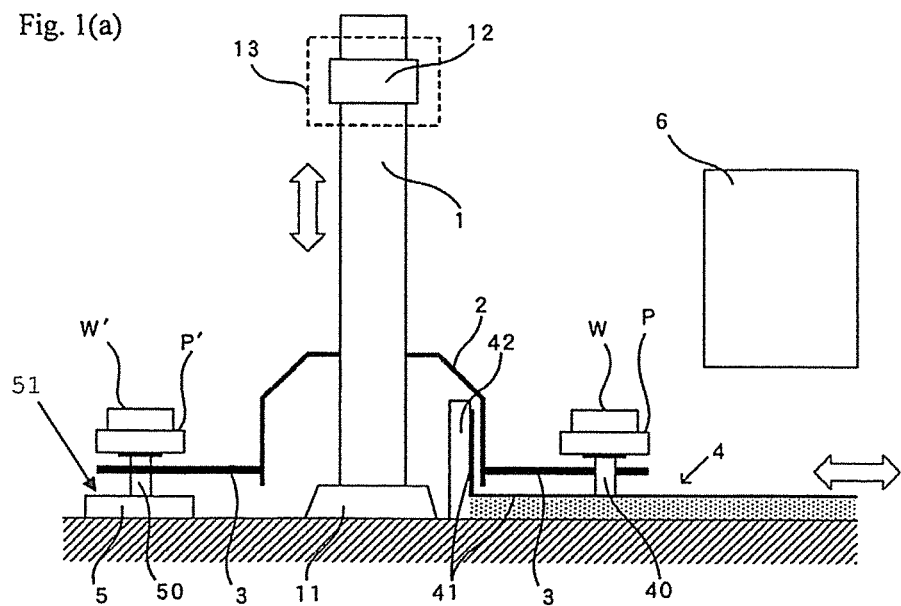
Figure 1B:
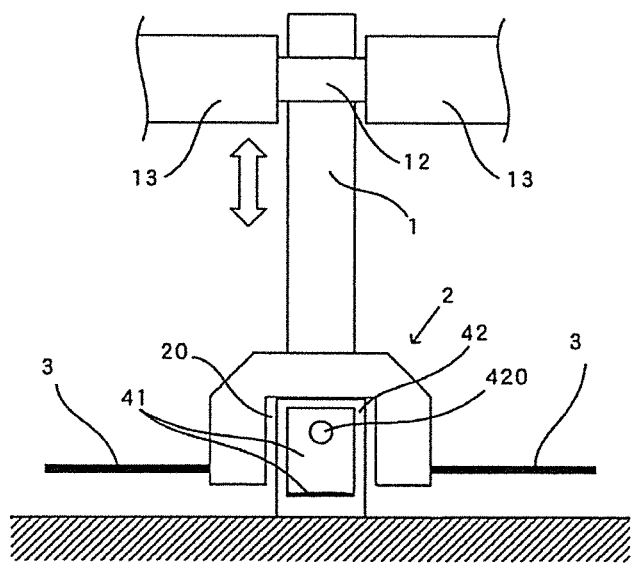
Figure 2A:
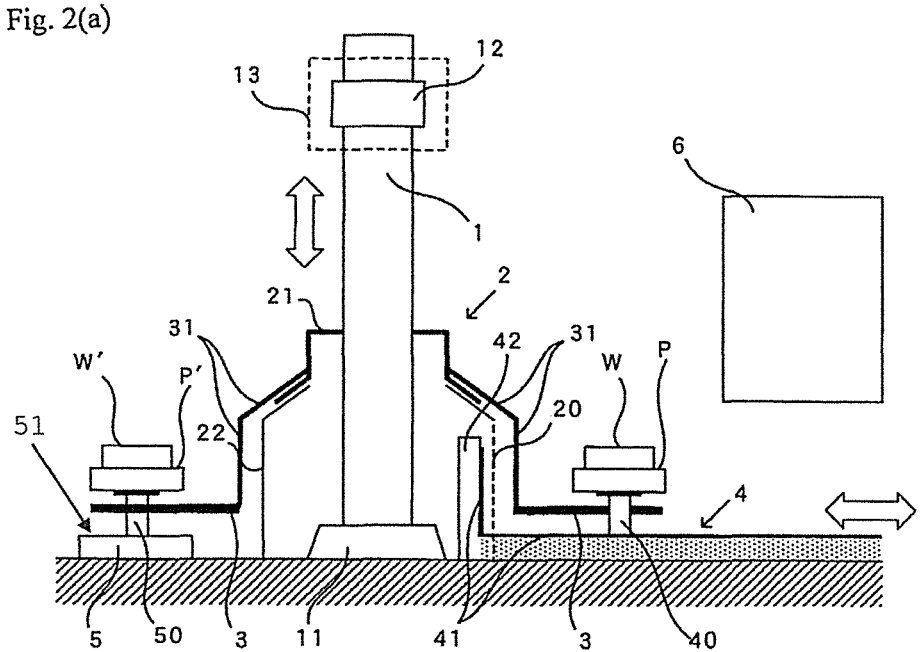
Figure 2B:
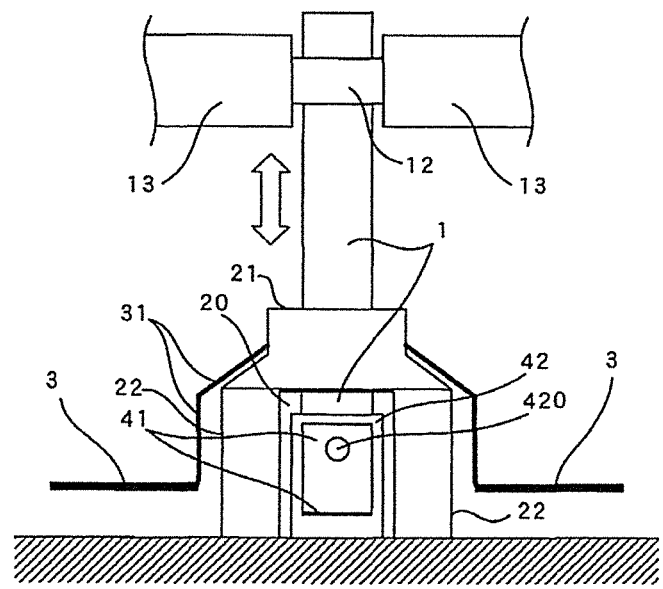
Figure 3A:
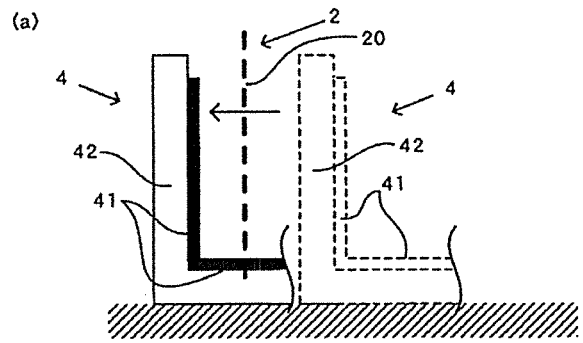
FIGS. 3(a)-3(g) are drawings which explain motions of a pallet changing apparatus of the basic configuration (1) which shows steps covering the start of changing a pallet and up to the completion thereof, as the first step in which the rising portion at the leading end of the table on the side of the turning shaft is inserted into the covering portion.
Figure 3B:
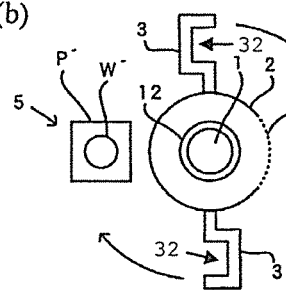
Figure 3E:
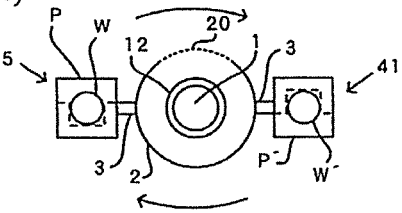
Figure 3C:
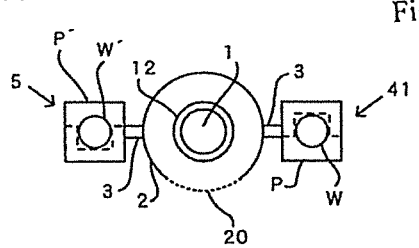
Figure 3F:
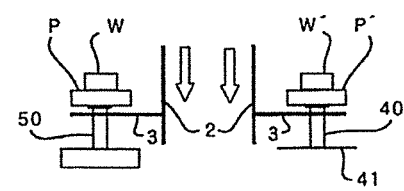
Figure 3D:
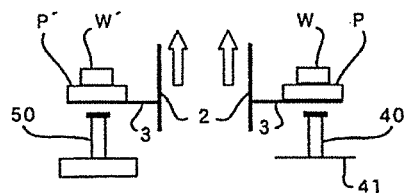
Figure 3G:
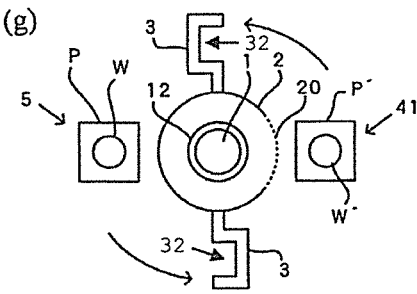
Figure 4A:
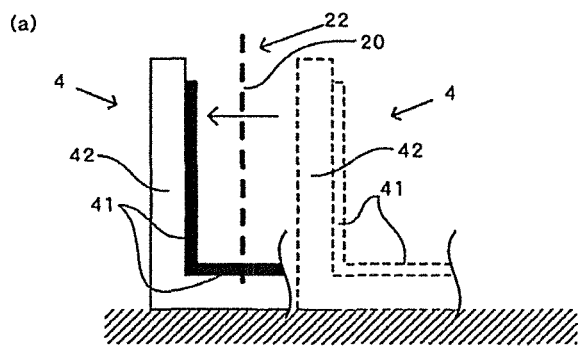
FIGS. 4(a)-4(g) are drawings which explain motions of a pallet changing apparatus of the basic configuration (2) which shows steps covering the start of changing a pallet and up to the completion thereof, as the first step in which the rising portion at the leading end of the table on the side of the turning shaft is inserted into the covering portion.
Figure 4B:
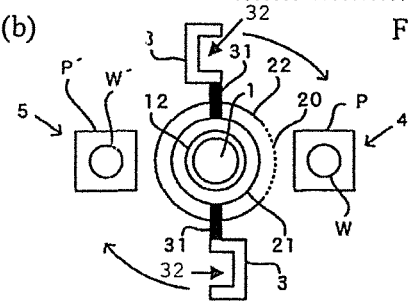
Figure 4E:
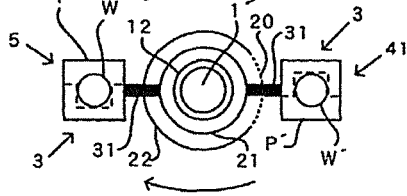
Figure 4C:
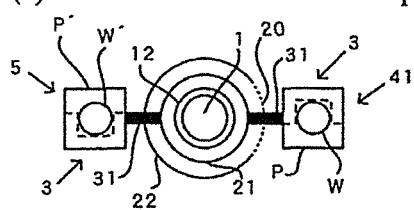
Figure 4F:
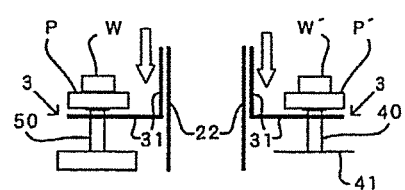
Figure 4D:
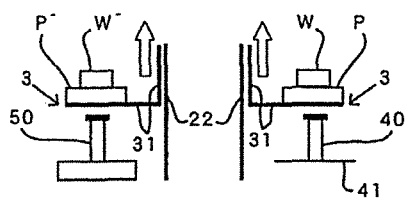
Figure 4G:
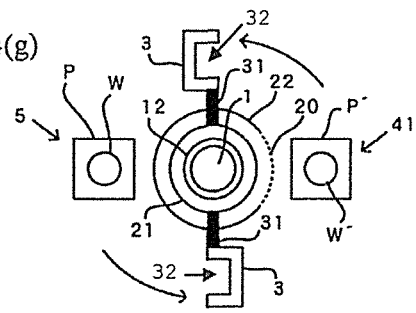

As described in the Technical Field, each of the basic configuration (1) shown in FIG. 1 and the basic configuration (2) shown in FIG. 2 stands on a technically basic premise that the table 4 moves back from and forth for a side of the turning shaft 1 and is also provided with the oscillating portion 41 which is supported so as to oscillate freely by means of a oscillating center axis 420 of the rising or upright portion 42 positioned at the leading end of the table on the side of the turning shaft 1 and places workpieces W, W' by means of pallets P, P'.

In the basic configurations (1) and (2), the oscillating portion 41 which supports the workpieces W, W' by means of the supporting frame 40 inside the table 4 and a supporting surface which supports the pallets P, P' by means of the supporting frame 50 inside the setup base 5 are both arranged so as to be lower than a position at which a supporting portion 32 of the pallet changing arm 3 turns. Therefore, the supporting portion 32 is arranged above a portion of the oscillating portion 41 and the supporting surface 51 of the setup base 5.

As shown in FIG. 1, the pallet changing arms 3 of the basic configuration (1) are extended in a horizontal direction from both sides of side portions of the covering portion 2 firmly fixed to the turning shaft 1. The supporting portion 32 positioned at the leading end of the extension turns down to a position below the pallets P, P' supported by the supporting frames 40, 50 and is also able to move to the oscillating portion 41 and an upper region of the supporting surface 51 of the setup base 5 together with the turning shaft 1 with the pallets P, P' of supported state.

As shown in FIG. 2, the pallet changing arms 3 of the basic configuration (2) are also extended on both sides from the movable covering portion 21 firmly fixed to the turning shaft 1. The supporting portion 32 at the leading end thereof turns down to a position below the pallets P, P' supported by each of the pallet supporting frames 40, 50 and is also able to move to the oscillating portion 41 and an upper region of the supporting surface 51 of the setup base 5 together with the turning shaft 1 with the pallets P, P' of supported state.

Then, as shown in FIG. 2(*a*), the pallet changing arms 3 of the basic configuration (2) are each provided with a cross-linking extending portion 31 which cross-links between the pallet supporting portion and the positions of the both sides of the movable covering portion 21.

In FIG. 2(*a*), (*b*), the cross-linking extending portion 31 is extended obliquely from a side of the movable covering portion 21 and forms approximately an L-letter shape. Various shapes can be adopted as the cross-linking extending portion 31.

Concretely, there can be adopted a shape in which the cross-linking extending portion 31 is curved sequentially by extending from a side of the movable covering portion 21 in a horizontal direction and forms a connection with the supporting portion 32, and additionally, an obliquely linear shape in which it extends from a side of the movable covering portion 21 and reaches the supporting portion 32.

As described so far, shape of the pallet changing arm 3 of the basic configuration (1) and that of the basic configuration (2) are different with each other. However, at a stage when the rising portion 42 of the table 4 is inserted into the insertion and removal hollow space 20, the rising portion 42 cannot be a hindrance to turning of the pallet changing arm 3.

In fact, the insertion and removal hollow space 20 often allows not only the rising portion 42 but also the oscillating portion 41 and a certain region of the table 4 such as a lower region which supports the oscillating portion 41 indicated by a dotted patterned region in FIG. 1(*a*) and in FIG. 2(*a*) to be inserted into the intersection and removal hollow space 20 or removed freely from the insertion and removal hollow space 20.

The turning shaft 1 of the basic configuration (1) is characterized in that it can adopt a simple configuration in which one covering portion 2 is firmly fixed and the pallet changing arm 3 is extended from the covering portion 2 in a horizontal direction.

The covering portion 2 of the basic configuration (1) covers the turning supporting portion 11 positioned at a lower end of the turning shaft 1, but is not in contact with a floor surface as long as it integrally turns with the turning shaft 1.

However, where such a configuration is adopted that the lower end of the covering portion 2 is below from a position at which the pallet changing arm 3 is extended and also arranged in the vicinity of the floor, it is possible to perform sufficiently functions of the covering portion 2 which prevents chips from entering into the turning supporting portion 11.

The turning shaft 1 of the basic configuration (2) firmly fixes the movable covering portion 21 which extends the pallet changing arms 3 on both sides above and achieves turning and vertical movement in an integral manner. It has a region which overlaps at least partially with the movable covering portion 21 in a vertical direction below the movable covering portion 21. A stationary covering portion 22 covering the turning supporting portion 11 positioned at the lower end of the turning shaft 1 and an insertion and removal hollow space 20 is provided at the stationary covering portion 22.

In the case of the basic configuration (2), as described previously, the pallet changing arm 3 is extended from the movable covering portion 21, and forms a relatively complicated shape. However, the stationary covering portion 22 is not connected to the pallet changing arm 3, thereby eliminating the need for such strength that is required for supporting the pallet changing arm 3, as compared with the covering portion 2 of the basic configuration (1). It is, therefore, possible to use a metal plate or a plastic plate which is thinner than the covering portion 2 of the basic configuration (1).

Further, the stationary covering portion 22 is arranged on the floor surface below, thus making it possible to prevent chips from entering into the turning supporting portion 11 positioned at a lower end side of the turning shaft 1.

Especially in the case of a configuration that the lower end side of the stationary covering portion 22 is firmly fixed on a floor, it is possible to completely prevent flying chips from entering thereinto.

Although it is essential that the turning shaft 1 of the basic configurations (1) and (2) turns together with the pallet changing arm 3 and also moves freely in a vertical direction, in order to achieve the above-described turning and vertical movement, as shown in FIG. 1(*a*), (*b*) and FIG. 2(*a*), (*b*), the driving portion 12 is connected to the turning shaft 1 and also firmly fixed to a floor surface or a wall portion. Thereby, it is firmly fixed to the fixed frame 13 which is in a fixed state and able to drive the turning and vertical movement.

In the basic configurations (1) and (2), as the first step of inserting the rising portion 42 of the table 4 and a certain region of the table 4 connected to the rising portion 42 into the insertion and removal hollow space 20, operation of changing the pallets P, P' from starting and until finishing can be achieved by the following processes, as shown in FIG. 3 and FIG. 4.

Process (a): insertion of the rising portion 42 of the table 4 (however, in most cases, the rising portion 42 and a certain region of the table 4 connected to the rising portion 42) into the insertion and removal hollow space 20, Process (b): integral turning of the pallet changing arms 3 in a stand-by state together with the turning shaft 1, Process (c): movement of pallets P, P' supported by the supporting frame 40 in the oscillating portion 41 of the supporting portion 32 of the pallet changing arm 3 and that of the pallets P, P' supported by the supporting frame 50 in the setup base 5 by downward turning, Process (d): upward movement of the turning shaft 1 of the pallet changing arms 3 which support the pallets P, P' and the covering portion 2 (in the case of the basic configuration (1)) or the movable covering portion 21 (in the case of the basic configuration (2)), Process (e): 180 degree-turning of the pallet changing arms 3 which support the pallets P, P', Process (f): downward movement of the turning shaft 1 of the pallet changing arms 3 which support the pallets P, P' and the covering portion 2 (in the case of the basic configuration (1)) or the movable covering portion 21 (in the case of the basic configuration (2)) and placement of each of the pallets P, P' on the supporting frame 40 of the oscillating portion 41 and on the supporting frame 50 of the setup base 5, Process (g): return to an original position by turning of the pallet changing arm 3.

As described above, in a state that the rising portion 42 of the table 4 (however, in fact, in most cases, a certain region of the table 4 connected to the rising portion 42) is accommodated inside the insertion and removal hollow space 20 of the covering portion 2, the basic configurations of (1) and (2) are able to smoothly change the pallets P, P' which respectively place workpieces W, W' by a series of turning and vertical movement.

Hereinafter, a description will be given with reference to the examples.

Example 1

Figures 5, 6:
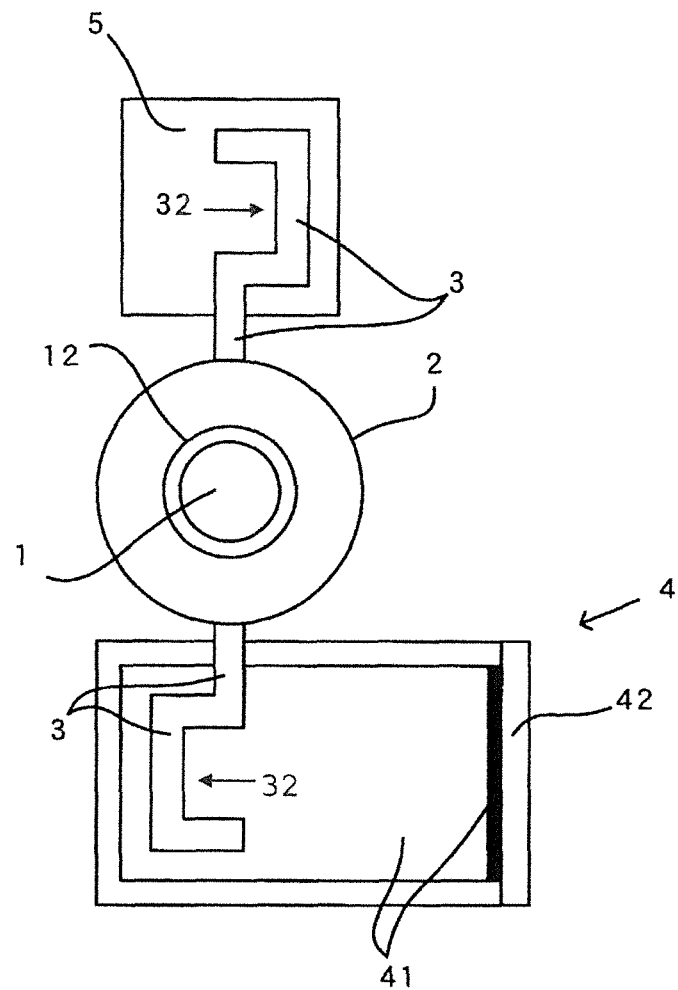
FIG. 5 is a top view which shows a state that the turning shaft and the pallet setup base are arranged in a direction which is orthogonal to a direction at which the table moves back and forth.
FIG. 6 schematically depicts a feature of either of the basic configuration (1) or the basic configuration (2).

Example 1 is characterized in that the covering portion 2 of the basic configuration (1) and the stationary covering portion 22 of the basic configuration (2) are each provided with a door (schematically shown in FIG. 6) for opening and closing the insertion and removal hollow space 20.

Installation of the door makes it possible to prevent chips from entering into the turning supporting portion 11 by closing the door even after insertion of the rising portion 42 and a certain region of the table 4 through the insertion and removal hollow space 20.

With a consideration on a space necessary for opening and closing the door, a sliding door is more preferable than a revolving door.

Example 2

Example 2 is characterized in that the basic configurations (1) and (2) achieve a state that the rising portion 42 inserted into the insertion and removal hollow space 20 is arranged in the vicinity of the surface of the turning shaft 1.

In Example 2, the pallet changing arms 3 can be made shortest in length by arranging the rising portion 42 in the vicinity, thereby achieving a compact pallet changing apparatus.

INDUSTRIAL APPLICABILITY

As described so far, in the present invention in which the rising portion can be inserted into the insertion and removal hollow space provided at the covering portion (in the case of the basic configuration (1)) or at the stationary covering portion (in the case of the basic configuration (2)), the presence of the rising portion does not hinder turning of the pallet changing arms. Further, the present invention is remarkably innovative in achieving a compact pallet changing apparatus and can be used in all types of machine tools that require pallet change.

REFERENCE SIGNS LIST

1: Turning shaft
11: Turning supporting portion
12: Driving portion for turning shaft
13: Fixed frame
2: Covering portion
20: Insertion and removal hole
21: Movable covering portion
22: Stationary covering portion
3: Pallet changing arm
31: Cross-linking extending portion
32: Supporting portion
4: Table
40: Supporting frame for pallet arranged at oscillating portion
41: oscillating portion of table
42: Rising portion of table
420: oscillating center axis of rising portion
5: Setup base
50: Supporting frame for pallet arranged on setup base
51: Supporting surface
6: Machine tool provided with main shaft, etc.
P, P': Pallet
W, W': Workpiece

The invention claimed is:

1. A pallet changing apparatus comprising:
a pallet setup base,
a table,
at least one pallet changing arm configured for transferring a pallet between the pallet setup base and the table,
a turning shaft for supporting the at least one pallet changing arm in a manner such that the at least one pallet changing arm moves freely in a vertical direction,
wherein the table is configured to move back from and forth to a side of the turning shaft,
the table including:
an upright portion extending upwardly from and at a leading end of the table on a side of the table that is closest to the turning shaft, and
an oscillating portion which is supported by the upright portion so as to oscillate freely about an oscillating center axis so as to position a workpiece via a pallet mountable to the oscillating portion,
the pallet changing apparatus further comprising a covering portion firmly fixed to the turning shaft at an upper side of the covering portion, and which covering portion covers a turning supporting portion positioned at a lower end of the turning shaft, and the covering portion including an insertion and removal hollow space which allows the upright portion to be inserted and removed freely therethrough, and wherein the at least one pallet changing arm includes a pallet supporting portion extending in a horizontal direction, the pallet supporting portion configured for transferring a pallet from a position on one side of the pallet changing apparatus, at which side of the pallet changing apparatus the insertion and removal hollow space is located, to a position on an opposite side of the pallet changing apparatus.

2. The pallet changing apparatus according to claim 1, wherein the covering portion includes a lower end which is lower than a position at which the at least one pallet changing arm is extended and which lower end is also arranged in the vicinity of a floor.

3. The pallet changing apparatus according to claim 2, wherein the insertion and removal hollow space allows the upright portion and a certain region of the table connected to the upright portion to be inserted freely into the insertion and removal hollow space and removed freely from the insertion and removal hollow space.

4. The pallet changing apparatus according to claim 2, further comprising a door for opening and closing the insertion and removal hollow space.

5. The pallet changing apparatus according to claim 2, wherein the upright portion, when inserted into the insertion and removal hollow space, is arranged in the vicinity of an outer surface of the turning shaft.

6. The pallet changing apparatus according to claim 1, wherein the insertion and removal hollow space allows the upright portion and a certain region of the table connected to the upright portion to be inserted freely into the insertion and removal hollow space and removed freely from the insertion and removal hollow space.

7. The pallet changing apparatus according to claim 6, further comprising a door for opening and closing the insertion and removal hollow space.

8. The pallet changing apparatus according to claim 6, wherein the upright portion, when inserted into the insertion and removal hollow space, is arranged in the vicinity of an outer surface of the turning shaft.

9. The pallet changing apparatus according to claim 1, further comprising a door for opening and closing the insertion and removal hollow space.

10. The pallet changing apparatus according to claim 9, wherein the upright portion, when inserted into the insertion and removal hollow space, is arranged in the vicinity of an outer surface of the turning shaft.

11. The pallet changing apparatus according to claim 1, wherein the upright portion, when inserted into the insertion and removal hollow space, is arranged in the vicinity of an outer surface of the turning shaft.

* * * * *